United States Patent [19]

Bell, Jr.

[11] 3,793,502
[45] Feb. 19, 1974

[54] SERVO FEED CONTROL CIRCUIT FOR ELECTRICAL DISCHARGE MACHINING APPARATUS

[75] Inventor: Oliver A. Bell, Jr., Mooresville, N.C.

[73] Assignee: Colt Industries Operating Corp., New York, N.Y.

[22] Filed: Oct. 6, 1972

[21] Appl. No.: 295,533

[52] U.S. Cl. .............................. 219/69 G, 219/69 C
[51] Int. Cl. .................................................. B23k 9/16
[58] Field of Search ........................ 219/69 G, 69 C

[56] References Cited
UNITED STATES PATENTS

| 3,686,461 | 8/1972 | Inoue | 219/69 G |
| 2,951,930 | 9/1960 | McKechnie | 219/69 C |
| 3,624,338 | 11/1971 | Ellis | 219/69 C |
| 3,649,802 | 3/1972 | Sennowitz | 219/69 C |

Primary Examiner—J. V. Truhe
Assistant Examiner—Hugh D. Jaeger
Attorney, Agent, or Firm—Hauke, Gifford, Patalidis & Dumont

[57] ABSTRACT

The servo feed system is controlled by machining gap voltage level to provide servo upfeed and downfeed at appropriate times according to gap. The servo circuit includes a pair of reference voltage potentiometers and a plurality of operational amplifiers which are switched selectively into series with a summing means and with a third operational amplifier in accordance with the gap polarity being used. A final current amplifier stage of push-pull configuration is connected between the output of the third operational amplifier and a control input terminal of a servo control coil.

13 Claims, 2 Drawing Figures

PATENTED FEB 19 1974 3,793,502

SERVO FEED CONTROL CIRCUIT FOR ELECTRICAL DISCHARGE MACHINING APPARATUS

Field of the Invention

The field to which this invention is applicable is that of electrical discharge machining, sometimes hereinafter referred to as "EDM" in which process material is removed from an electrically conductive workpiece by erosive electrical discharges passed across a dielectric filled gap from a tool electrode. The process is precisely controlled, usually by the use of a pulse generator and one or more electronic output switches which periodically are turned on at a preset frequency to connect a D.C. power supply to the gap thus to provide machining power pulses and gap discharges. Machining pulse duration is adjustable to control cutting current level to suit the type of operation being formed — roughing or finishing. For some workpiece and electrode material combinations it is desirable to operate the apparatus with standard polarity, that is, with the electrode negative and the workpiece positive. In other set ups, for example, where a graphite material electrode is used, the reverse polarity mode is used in which the electrode is positive and the workpiece negative. It thus becomes important to have a servo control circuit which operates independently of the gap polarity at which the power supply may be operated. Certain prior art systems require actual manual connections of the sensing leads as the power leads are changed to verify that the correct control polarity signals are being furnished to the servo feed control circuit.

Summary of the Invention

This invention provides an improved EDM servo feed system which provides a stable feed operation of the apparatus which continues independently of the polarity of the gap elements. All servo references are to ground or zero voltage potential to simplify changeover between the two machining polarities.

Description of the Preferred Embodiment

Figure 1:
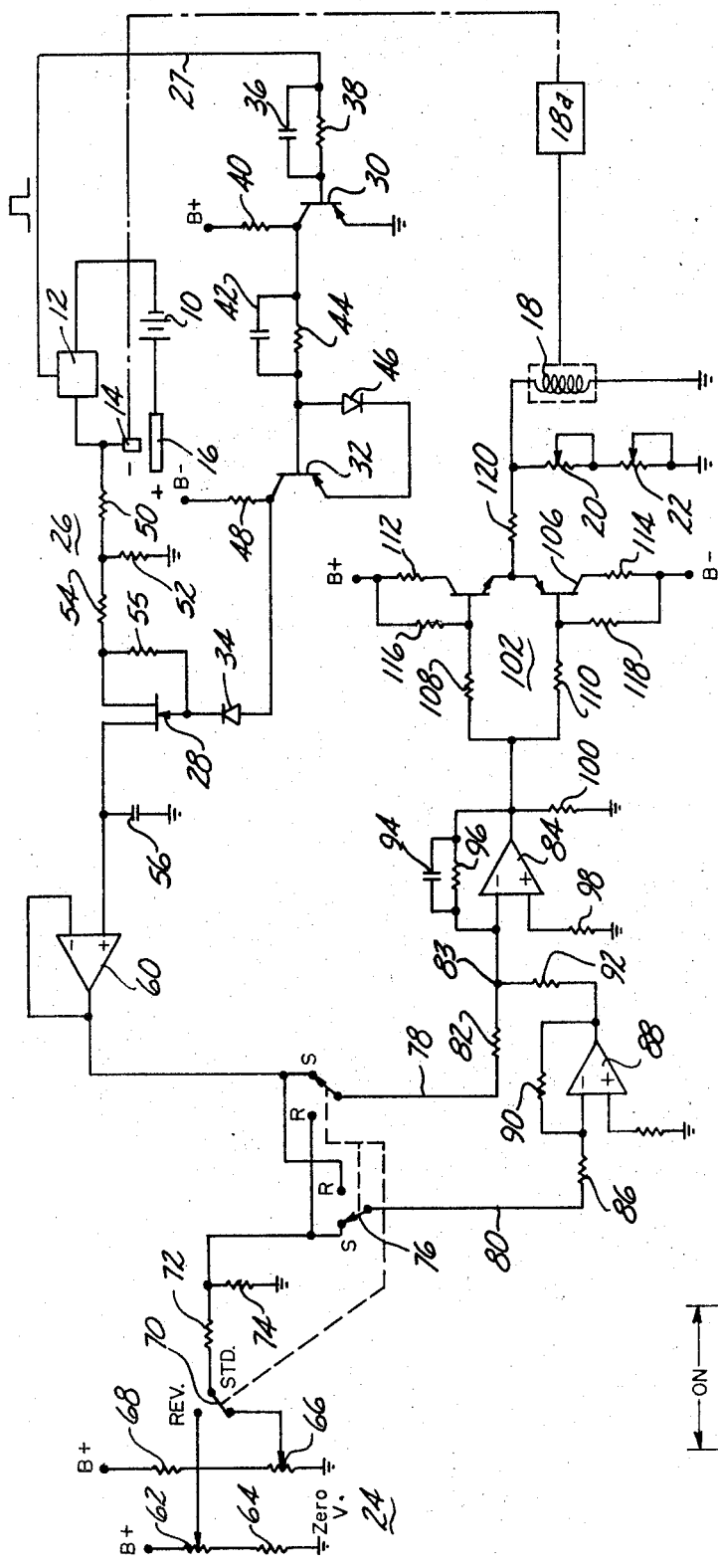
FIG. 1 is a partially block diagrammatic, schematic drawing of the invention.

The basic elements of an electrical discharge machining power supply are shown at the upper right hand corner of the drawing, partially in block form. Included in the power supply circuit is a DC power supply 10 and a pulse generator 12. The pulse generator 12 usually includes a plurality of electronic switches having their principal or power conducting electrodes connected in series between one terminal of the DC power supply 10 and the gap. In FIG. 1, the power supply circuit illustrated is of the standard polarity with the negative terminal of the power supply 10 connectable through the switching means included in the power supply 12 to the electrode 14. The positive terminal of the DC power supply 10 is connected to a workpiece 16 as shown. The pulse generator 12 is shown in block form in the interest of simplifying this disclosure. It may be embodied for example in the form of a multivibrator and electronic output switch system, several appropriate types of which are illustrated in Walter Lobur U.S. Pat. No. 3,243,576 issued on Mar. 29, 1966 for "Electrical Discharge Machining Apparatus" and of common ownership with this application.

The servo feed control circuit normally includes a reversible hydraulic or electrical drive motor the complete detail of which is not shown, which is operably coupled to one of the gap elements-electrode 14 or workpiece 16 for movement of one relative to the other as machining progresses and workpiece material is removed. This mode of operation and apparatus for carrying it out are well known in the prior art. One electrohydraulic servo feed system suitable for EDM is disclosed and described in detail in Robert S. Webb, U.S. Pat. No. 3,289,029 issued on Nov. 29, 1966 for "Servo Feed Apparatus for Electrical Discharge Machining," which patent is also of common ownership herewith. The control of the hydraulic power feed system is provided by an electrically energized element i.e. a servo valve coil 18 which may be incorporated in any standard servo valve. The direction of backup or downfeed of the electrode 14 is thus controlled by the current flow through the coil 18. The servo coil 18 is shunted by a pair of series connected potentiometers 20 and 22. The magnitude of the resistor element in the potentiometer 20 is substantially greater than that of the resistor element of the potentiometer 22 so that the two may be used for coarse and fine adjustment of servo velocity, respectively.

The basic parts of the servo control system include a reference voltage network 24 and a gap voltage sensing network 26. The sensing network 26 includes at its left hand end a servo gate switch field effect transistor 28. The gating operation is controlled by a keying network operated from the pulse generator 12 in a manner as to enable amd key the gap voltage sensing network 26 during machining power pulse on-time. The general mode of operation of the gating system will be seen from FIG. 2 and will be further explained in the Section "Description of Operation" hereinafter. It will be understood that a keying signal may be derived from an appropriate stage of the pulse generator 12. An example of a keying system appropriate for use is shown and described in my co-pending U.S. Pat. application No. 196,439 filed on Nov. 8, 1971, for "Cut-Off Protection System For Electrical Discharge Machining Power Supply." The gating network further includes a keying input lead 27 from the pulse generator 12 and a pair of PNP transistor stages comprising a transistor 30 and a transistor 32. The output of the transistor 32 is coupled through a diode 34 to the base of the field effect transistor 28 for controlling its conduction. A parallel RC network including a capacitor 36 and a resistor 38 is connected in the input to the base of the transistor 32. A load resistor 40 is connected between a suitable positive voltage source and the emitter of the transistor 30. The output from the emitter of the transistor 30 is coupled to the base of the transistor 32 through an RC signal network including a capacitor 42 and a resistor 44. The transistor 32 has its emitter connected to a positive voltage source and its emitter-base junction shunted by a protective diode 46. A load resistor 48 is connected between the collector of the transistor 32 and a suitable negative voltage source.

The gap voltage sensing network includes resistors 50, 52 and 54. The field effect transistor 28 has its gate-source junction shunted by a resistor 55. A capacitor 56 is connected between the output of the field effect transistor 28 and the input to an operational amplifier 60.

The reference voltage network 24 is shown at the upper left hand side of the drawing of FIG. 1. Included in the reference voltage network 24 is a first potentiometer 62 and a fixed resistor 64 which are connected in series between a positive voltage source and ground. A second potentiometer 66 and a fixed resistor 68 are likewise connected in series between a positive voltage source and ground. The potentiometers 62, 66 are of a like resistance magnitude and the fixed resistors 64 and 68 are also of like values. A switch 70 having a contact movable between an upper reverse polarity position and a lower standard polarity position is connectable to the respective movable contacts of the potentiometers 62 and 66. The reference voltage output is passed through a series resistor 72 with a resistor 74 connected to ground as shown. A second switch 76 which is preferably ganged for operation with the switch 70 is shown. The switch 76 includes a left hand movable contact and a right hand movable contact both of which contacts are movable as shown between a pair of corresponding standard polarity settings and reverse polarity positions. The switch 76 is illustrated in its standard polarity condition. A pair of output leads 78 and 80 are connected to take the preselected outputs from the switch 76. The signal from the lead 78 is passed through a series resistor 82 as an input to an operational amplifier 84. The output taken from the lead 80 is passed through a series resistor 86 as an input to the operational amplifier 88 with a gain of one for inversion purposes. The two inputs just referred to are thus summed at point 83 which is the input for the third operational amplifier 84. The operational amplifier 88 is shunted by a resistor 90 while its output is passed through a series resistor 92 to provide an input to the minus input terminal of the differential amplifier 84. The negative input terminal and the output terminal of the differential amplifier 84 are shunted by an external RC network including a capacitor 94 and a resistor 96 while the positive input terminal of the operational amplifier 84 is grounded through a resistor 98. A second resistor 100 is connected between the output of the operational amplifier 84 and ground. The operational amplifier 88 is designed to have a gain of approximately one.

The final stage of the current of the servo control circuit includes a current amplifier state 102 which comprises an NPN transistor 104 and a PNP transistor 106 connected in push-pull configuration. The signal output from the operational amplifier 84 is coupled through a pair of series resistors 108 and 110 respectively to the bases of the two transistors 104 and 106. A series load resistor 112 is connected to the collector of the transistor 104. A load resistor 104 is connected in series with the collector of the transistor 106. Shunt resistors 116 and 118 are connected to complete the circuit. A B plus voltage source is connected to the upper end of the resistor 112 and a B minus voltage source is connected to the lower end of the resistor 114. It will be seen that the transistors 104 and 106 operate in push-pull to provide a controlled signal output through resistor 120 and through the servo control coil 18 and the parallel connected potentiometers 20 and 22.

Figure 2:
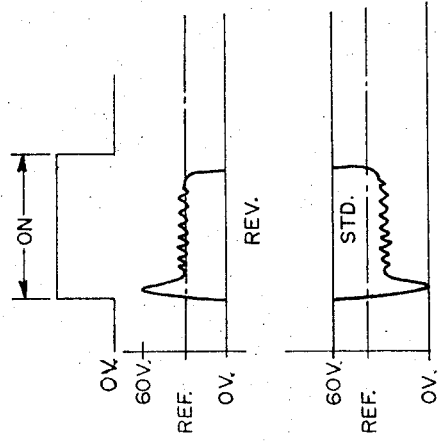
FIG. 2 is a set of voltage waveform diagrams plotted against time showing the gap voltage excursions during standard and reverse voltage operation.

The voltage waveform of FIG. 2 illustrates the keying voltage pulses which are generated in phase with gap machining power pulses. An on-time keyed pulse is illustrated in the upper of the three voltage waveform diagrams. The middle voltage waveform is that which would occur at the gap during reverse polarity operation. It is significant that all reference voltages are made to ground or zero voltage level. The middle voltage waveform diagram illustrates the gap voltage excursion during reverse cutting polarity, that is, with the electrode 14 positive and the workpiece 16 negative. It is noted that the present reference voltage level is illustrated by the reference dash line. With the power supply operating in the reverse polarity condition, whenever the gap voltage signal rises above the preset reference level set by potentiometer 62 there is a servo feed down. The lowermost voltage waveform diagram illustrates the signal as it occurs across the gap during standard polarity operation. The preset reference voltage lever is shown in dash line. The signal is compared to ground level by the servo control circuit. Whenever the gap voltage drops below the preset level set by the potentiometer 66 voltage level, there will be provided a servo feed down.

DESCRIPTION OF OPERATION

The operation of the power supply begins with the operation of the pulse generator 12 and its electronic switching devices to provide machining power pulses across the gap between the electrode 14 and the workpiece 16. As already described, the machining power pulses generated are of precisely controlled on-off time and frequency. The switches 70 and 76 which are preferably ganged for conjoint operation are placed in the position illustrated with the movable contact in each respective standard position terminal. The servo gate as it is controlled by the conduction of the field effect transistor 28 is keyed into conduction by a positive pulse furnished to its gate electrode in phase with each pulse on-time as illustrated in the upper portion of the FIG. 2 voltage waveform. The keying signal which is derived from the pulse generator 12 is passed through the stage including the transistor 30 to turn it off. The transistor 32 is then turned on and thus provide a positive pulse to the gate of the transistor 28 to forward bias it and provide an output signal to charge the capacitor 56. At the end of the on-time, transistors 30 and 32 are turned off and the keying signal is removed from the gate of the field effect transistor 28. Arc voltage during on-time is stored in capacitor 56 during off-time. Transistor 28 is off during off-time. The operational amplifier 60 is a voltage follower and has almost infinite input impedance. This serves to keep the servo from backing up during short on-times and long off-time cutting operation.

In the standard polarity operating position of the several switches including switches 70 and 76, the signal path is from the output of the operational amplifiers 60 through resistor 82 and to the upper input terminal of the operational amplifier 84. At the same time, there is provided a voltage signal from the preset potentiometer 66 through resistor 72, the lead 80, and the resistor 86 to the upper input of the operational amplifier 88 whose output then passed through series resistor 92, to terminal 82 where it is summed with the signal from the amplifier 60 to the upper terminal of the operational amplifier 84. The output signal then provided through the resistors 108 and 110 to the respective bases of the push-pull transistors 104 and 106. This signal controls the conduction of current through the servo control coil 18 and therefore the servo operation. Assuming that in standard polarity, the reference voltage level which has been preset on the potentiometer 66 is of the order of +30 volts, and the gap voltage through network 26 goes above +30 reference as shown in the lower portion of the FIG. 2 waveform diagram, then the control output to the push-pull amplifier stage 102 and through the servo control coil 18 will be of a magnitude to provide tool electrode 14 backup. This represents the abnormal or gap short circuit condition. If the voltage falls between the reference voltage and the zero volt level, then normal servo downfeed operation will continue as the machining progresses.

When the operation of the EDM power supply circuit is changed such as by changing or by switching the connection of the leads between the electrode 14 and the workpiece 16 then the gap polarity will be of the opposite or reverse type. At this point, switches 70 and 76 are ganged operated with the several reverse or "R" positions. The keyed operation of the servo gate through th transistor 28 is repeated but with a somewhat different mode of operation because of the changed connections between the reference potentiometer, that is potentiometer 62, and the output of operational amplifier 60 and the following stages of the servo control circuit. In the reverse position of switch 70, the voltage preset on the potentiometer 62 is passed through the switch 70, through the resistor 72 to the right hand terminal R of the switch 76, through the resistor 82, and to the upper input terminal of the operational amplifier 84. At the same time, the output signal from operational amplifier 60 is passed through the rightwardly moved contact and the left hand terminal R of the switch 76, through the resistor 86, to the upper input terminal of the operational amplifier 88, through the resistor 92 and again to the upper input terminal of the operational amplifier 84. In either case, all the several input signals are referenced to zero voltage level so that whether the polarity has been changed over from reverse to standard or not, a suitable control signal is available as an input to the operational amplifier 84 and finally to the current amplifying transistor stage 102 and to the servo control coil 18.

It will thus be seen that I have provided an improved servo feed control circuit and system for operating an EDM apparatus. The servo feed control circuit is of particular value in that it provides a reliable and appropriate control signal and reference which is compared to the gap voltage signal to operate the servo system. The servo control circuit can be conditioned to operate in either condition of the machining gap polarity.

What is claimed is:

1. A servo feed system for EDM apparatus operable in either standard or reverse gap polarity comprising a means coupled to the apparatus and the machining gap for providing an output signal representative of gap voltage level, a pair of different magnitude reference voltage sources each corresponding to a different gap polarity and both referenced to ground voltage, a summing means for providing an output signal representative of the magnitude of a selected one of said reference voltage sources and the gap sensed, and manipulative means for switching one of the two aforesaid reference voltages corresponding to a selected one of said gap polarities in connection with said summing means to provide an appropriate polarity control servo signal.

2. In an electrical discharge machining apparatus for machining a conductive workpiece by discharges between a tool electrode and the workpiece across a dielectric coolant filled gap, a servo feed system for providing relative movement between said electrode and said workpiece including a reversible motive means and an electrically energized element for controlling the operation of said motive means, a gap voltage sensing means coupled to said gap, and a means responsive to the voltage signal from the gap wherein the improvement comprises a pair of different magnitude reference voltage sources both referenced to zero voltage, manually operated switching means for conjointly selecting one of two gap polarities and a corresponding one of said reference voltage sources, a means for summing the gap voltage signal and a preselected one of those reference voltages and coupling the summed signal to the terminal of said element for controlling current conduction therethrough and the operation of the motive means.

3. The combination as set forth in claim 2 wherein said motive means has its velocity controlled by a potentiometer, said potentiometer operatively coupled across said element.

4. The combination as set forth in claim 2 wherein a gating switch is connected to said gap voltage sensing network for rendering it operative in phase with gap machining pulse on-time.

5. The combination as set forth in claim 4 wherein said gating switch comprises a field effect transistor and wherein a keying means is operatively connected to it for rendering it conductive in phase with machining pulse on-time.

6. The combination as set forth in claim 5 wherein a capacitor is coupled to the output lead of said field effect transistor for reverse biasing it and turning it off prior to its initiation by the next following machining pulse on-time.

7. The combination as set forth in claim 2 wherein said reference voltage source include in each case a potentiometer coupled to a voltage source.

8. The combination as set forth in claim 7 wherein a ganged switching means is operatively connected between a preselected one of said potentiometers and the gap voltage output respectively.

9. A servo feed system for an electrical discharge machining apparatus in which a conductive workpiece is machined by electrical discharges from a tool electrode across a dielectric coolant filled gap with manually reversible and selective gap polarity, comprising a reversible motive means for providing relative movement between said electrode and workpiece as material is removed from said workpiece, an electrically energized element operatively connected to and controlling the operating of said motive means responsive to current flow through said element, wherein the improvement comprises, a system for regulating the current flow through said element including a sensing network coupled to one of said gap elements for providing an output representative of gap voltage, a first reference voltage source of relatively low voltage level, a second reference voltage source of relatively high voltage level, manipulative means for switching one of th aforesaid references into circuit in accordance with selected gap polarity, a summing means for adding said one of said reference voltages to said gap voltage and deriving a control signal therefrom and coupling it as a control signal to said electrically energized element.

10. The combination as set forth in claim 9 wherein a gating means is connected intermediate said gap elements and said means for summing, said gating means operable in phase with gap discharge.

11. The combination as set forth in claim 10 wherein said gating means includes a field effect transistor gated in phase with said gap discharges.

12. The combination as set forth in claim 9 wherein said first and second reference voltage sources are derived in each case from a potentiometer and a fixed resistor series connected between a voltage source and ground.

13. The combination as set forth in claim 9 wherein a first operational amplifier is connected between said sensing network and said summing means, wherein a second operational amplifier is connected intermediate said reference sources and said summing means, and wherein a switching means is included intermediate said reference sources and said sensing network respectively and said differential amplifier for coupling a selected one of said reference sources to a terminal of said summing means.

* * * * *

UNITED STATES PATENT OFFICE
CERTIFICATE OF CORRECTION

Patent No. 3,793,502                Dated February 19, 1974

Inventor(s) Oliver A. Bell, Jr.

It is certified that error appears in the above-identified patent and that said Letters Patent are hereby corrected as shown below:

IN THE SPECIFICATION

Col. 2, line 42, correct "an" to --any-- .
Col. 3, line 57, correct "resistor 104" to --resistor 114-- .
Col. 4, line 12, change "present" to --preset-- .
Col. 5, line 24, correct "th" to --the-- ,
         line 41, preceding "zero" insert --a-- .

IN THE CLAIMS

Col. 5, line 65, following "gap" insert --voltage-- .
Col 6, line 66,  correct "th" to --the-- .

Signed and sealed this 2nd day of July 1974.

(SEAL)
Attest:

EDWARD M. FLETCHER,JR.              C.MARSHALL DANN
Attesting Officer                   Commissioner of Patents